SEMICONDUCTIVE ASSOCIATIVE MEMORY SYSTEM

Filed Jan. 17, 1966

INVENTOR
EDWIN S. LEE, III
BY
Christie, Parker & Hale
ATTORNEYS.

INVENTOR
EDWIN S. LEE, III
BY
Christie, Parker + Hale
ATTORNEYS.

United States Patent Office 3,491,342

Patented Jan. 20, 1970

3,491,342

SEMICONDUCTIVE ASSOCIATIVE MEMORY SYSTEM

Edwin S. Lee III, Claremont, Calif., assignor to Burroughs Corporation, Detroit, Mich., a corporation of Michigan Filed Jan. 17, 1966, Ser. No. 520,966
Int. Cl. G11b 9/00, 13/00
U.S. Cl. 340—173 10 Claims

ABSTRACT OF THE DISCLOSURE

An associative memory system having a single active element which has at least two stable states and has a semiconductor element with at least two electrodes. An impedance element is connected to one of the electrodes, a junction between said electrode and the impedance element functions as a control terminal. Means is connected to the control terminal for signalling the comparison between an undergoing comparison and binary bit represented by the conductive condition of the semiconductor element. Potential means, individually controllable for representation of binary data undergoing comparison, is connected to the free electrode of the semiconductor element and the remaining electrode of the impedance element.

This invention relates to memory systems and, more particularly, to improved associative memory systems and associative cells therefor.

Associative memories have been developed whereby the information stored in the memory system may be obtained without any indication of the physical location of a particular piece of information in the memory system. In all these systems the memory cells generally comprise two active elements for storing the binary character therein. The number of active elements for a memory cell increases the cost and complexity of the memory system as they are presently known. One such memory system in which the memory cells comprise a pair of active elements is disclosed in my co-pending application entitled "Memory System" assigned to the same assignee as the present application now issued as Patent No. 3,417,265.

The present invention provides an improved associative memory system employing single active devices, rather than two or more active devices, as the associative memory cells. The single active devices are preferably solid state elements which may take the form of four-layer diodes, gate electrode controlled rectifiers, such as the silicon controlled rectifier or the gate-off switch, all of which are presently commercially available. All of these single active devices are controlled to store the binary characters in terms of their conductive and non-conductive states.

Structurallly, the associative memory system of the present invention comprises the single active elements arranged in rows and columns. The bits of the same binary significance are arranged in the same columns, while the bits of the same word are arranged in the same row. A compare register is provided for storing a word to be compared with the memory words and is arranged with the comparison memory cells storing the comparison word with the bits of the same binary significance arranged with the corresponding bits of the memory words in the same column. In the same fashion, each memory word has its bits connected to a word match detector for signalling a matching or mismatching relationship between a compare word and a memory word. The bits stored in the comparison register are logically controlled for controlling the potential across the single active element for producing a comparison response at each memory cell and coupling the response to the corresponding match detectors. In the same fashion the single active elements are controlled for reading and writing purposes.

Figure 1:
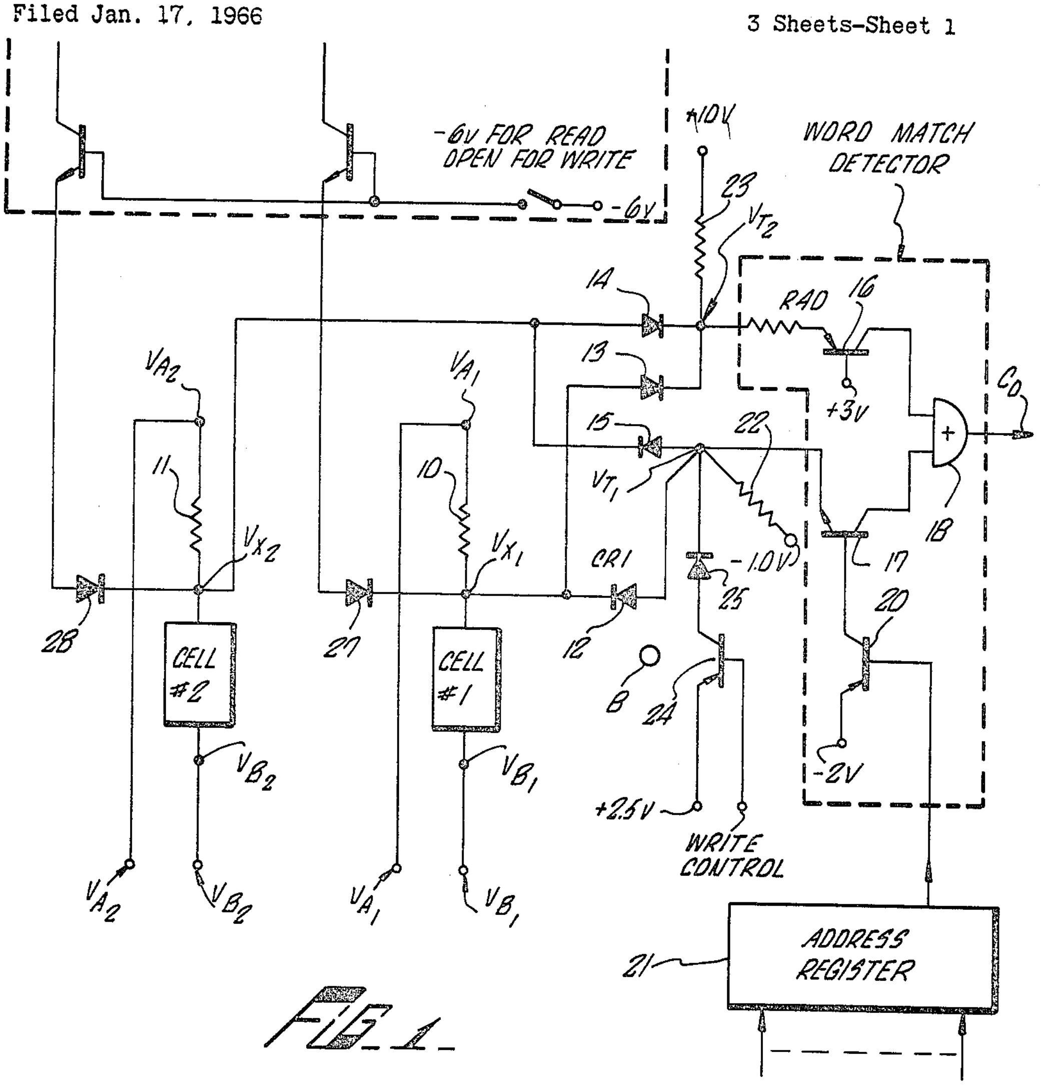
Figure 2:
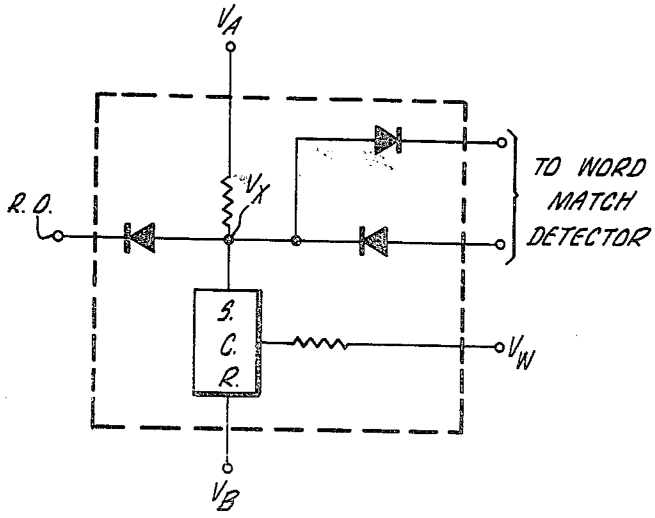
Figures 3, 4B:
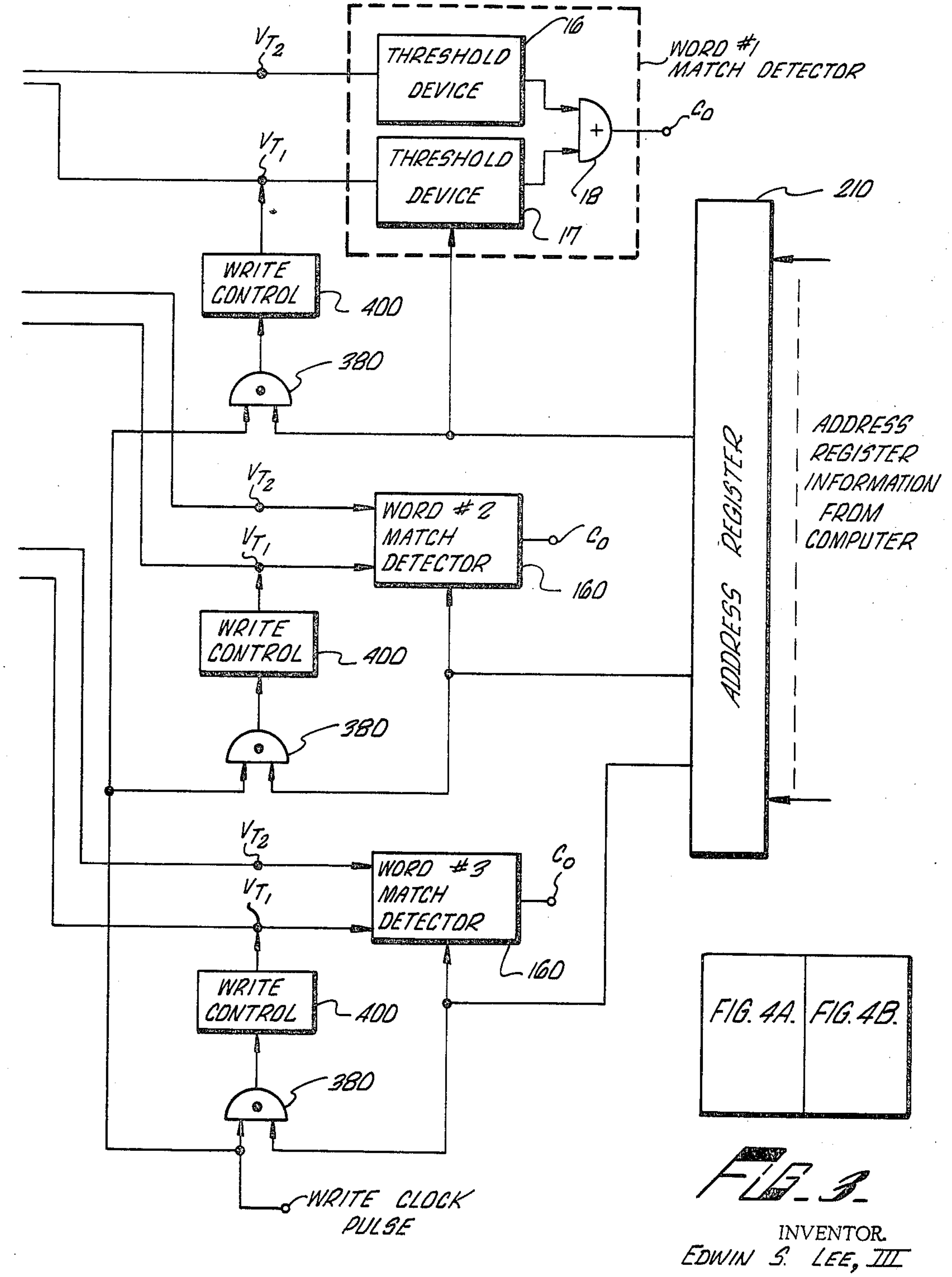
Figure 4A:
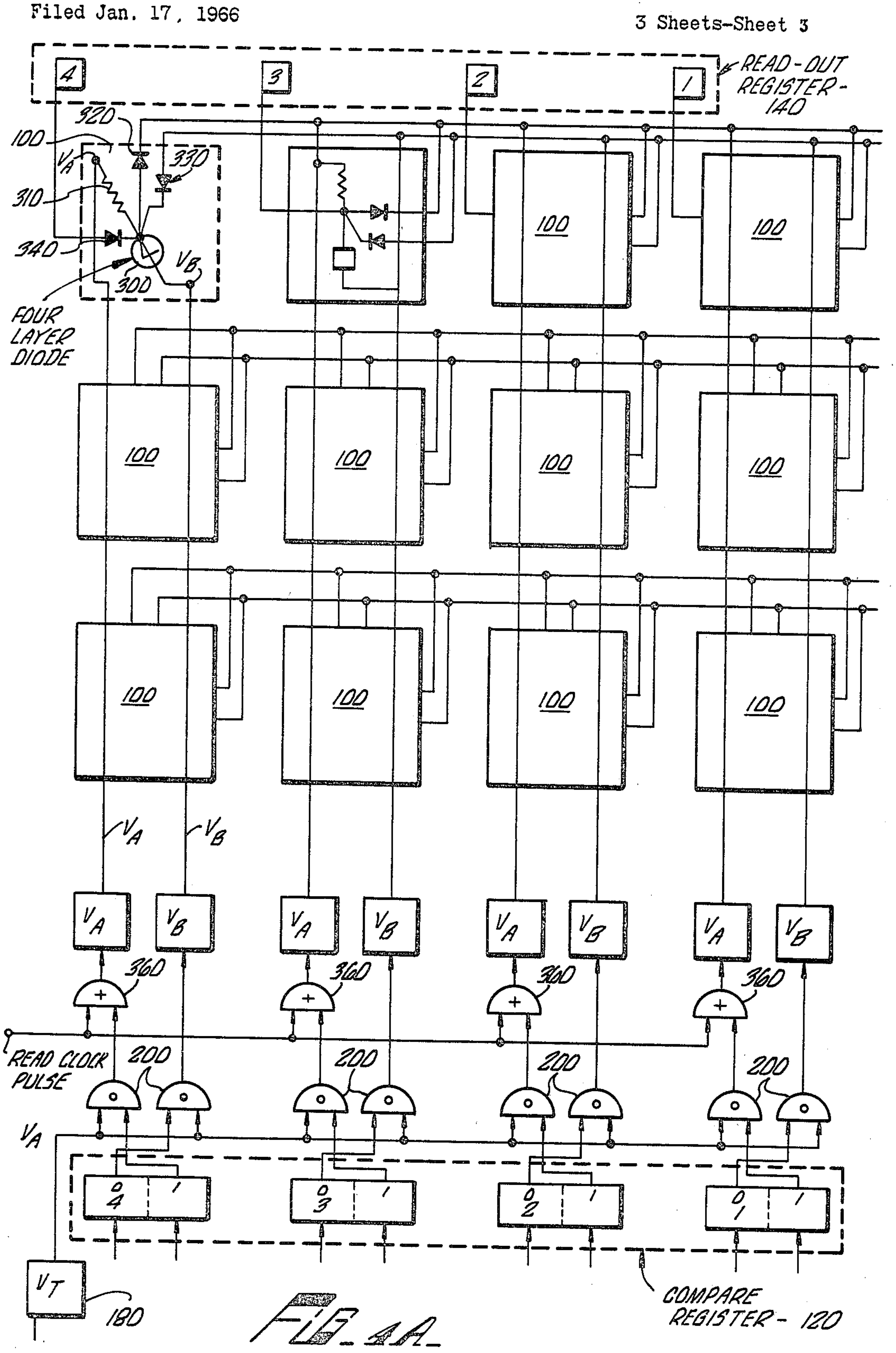

These and other features of the present invention may be more fully appreciated when considered in the light of the following specification and drawings, in which:

FIG. 1 is a schematic diagram of a pair of associative memory elements and the controls therefor and embodying the invention, FIG. 2 is a schematic diagram of a single three electrode device arranged as an associative element to be used in the memory system of FIG. 1, FIG. 3 is to show how FIGS. 4*a* and 4*b* are to be taken together.

FIGS. 4*a* and 4*b* taken together form a schematic-block diagram of an associative memory system embodying the invention.

Now referring to FIG. 1, the structural organization of an associative memory system implementing a single active device will be described. The described single active device can be considered to be a four-layer diode. The structural organization of FIG. 1 shows two associative cells as they may be arranged to store the bits of a single binary word. The associative cells are identified as cell No. 1 and cell No. 2, and when they are constructed from a four-layer diode, the anode electrode of the cells are connected to the terminals $V_{B_1}$ and $V_{B_2}$, respectively connected to cells 1 and 2. The cathode electrodes of these cells are correspondingly connected to the terminals $V_{X_1}$ and $V_{X_2}$. The terminals $V_{X_1}$ and $V_{X_2}$ are in turn connected through cathode impedance elements 10 and 11 to the respective cell input terminals $V_{A_1}$ and $V_{A_2}$. The input electrodes of the associative cell, then, can be considered to the be the terminals $V_A$ and $V_B$ with the appropriate subscripts to relate them to the correct cell. The control of the potentials applied to the terminals $V_A$ and $V_B$ is defined to control the storage state of the cell as well as the logical operations to be performed thereon.

Arranged with each cell is a pair of sensing diodes for determining the storage state or conductive condition of the cells. To this end, a pair of diodes 12 and 13 are connected to the terminal $V_{X_1}$ and are thereby associated with cell No. 1, while a corresponding pair of diodes 14 and 15 are connected to the terminal $V_{X_2}$ and are thereby arranged with cell No. 2. The diode 13 is poled so that its anode electrode is connected to the terminal $V_{X_1}$ in common with the cathode electrode for the diode 12. The remaining electrodes for the diodes 12 and 13 are connected to the terminals $V_{T_1}$ and $V_{T_2}$, respectively, and which terminals are the output terminals for a word match detector. In the same fashion, the diodes 14 and 15 are arranged with the anode electrode for the diode 14 and the cathode electrode for the diode 15 connected in common with the terminal $V_{X_2}$. The remaining electrodes or the cathode electrode for the diode 14 is connected to the output terminals $V_{T_2}$ of the word match detector while the remaining terminal for the diode 13 is connected to the terminal $V_{T_1}$ of the same word match detector.

The word match detector comprises a pair of threshold devices for detecting the voltages appearing at the input terminals $V_{T_1}$ and $V_{T_2}$. As illustrated, these threshold detectors are represented as transistor detectors 16 and 17 and which transistors are of the opposite conductivity type. The emitter electrode for the transistor 16 is connected to the input terminal $V_{T_2}$. The output electrode or the collector electrode for the resistor 16 is connected to an input terminal of an OR circuit 18. The base electrode for the transistor 16 can be considered to be connected to a potential source on the order of +3 volts.

The transistor 17 has its emitter electrode connected to the terminal $V_{T_1}$. The output electrode for this transistor 17 is connected to the remaining input terminal of the OR circuit 18. The base electrode for the transistor 17 is connected to the collector electrode of a switching transistor 20. The emitter electrode for the transistor 20 is connected to a negative potential source on the order of 2 volts. The base electrode for the transistor 20 is connected to the output of an address register 21 to be controlled therefrom. The signals derived from the address register 21 control the potential applied to the base of the transistor 20 and thereby control the conductive or non-conductive condition of this transistor.

The output circuit for the word match detector is defined by the output circuit of the OR gate 18. The logical arrangement of the OR gate 18 is such that a true output indication or a matching output indication is provided when both cells No. 1 and No. 2 match the information undergoing comparison and a false or mismatching output indication will be provided from the OR gate 18 if either cell No. 1 or cell No. 2 or both mismatch. A mismatch condition is produced if current is conducted through the emitter (and thence to the collectors) of either transistor 16 or 17. This current is in excess of the very slight biasing currents through resistor 23 and resistor 22 and can only come from a mismatching cell through one of the diodes (12, 13, 14 or 15).

The potential $V_{T_1}$ is normally determined by the base voltage on transistor 17. It should be stated that transistor 24 is normally off (it is only turned on during the write cycle). Transistor 20 is normally "on" so that the base voltage of transistor 17 is essentially equal to the emitter voltage of transistor 20. Transistor 20 is only turned off during the read cycle or write cycle when that word is addressed. Under the normal conditions $V_{T_1}$ is slightly more negative than −2 volts.

The terminal $V_{T_1}$ of the word match detector has its potential in part controlled by the application of a negative voltage thereto on the order of −1 volt through a dropping resistor 22. In the same fashion, the terminal $V_{T_2}$ is connected to a dropping resistor 23 to a positive source of potential on the order of +10 volts. Resistors 22 and 23 only provide biasing current. These currents cannot make the Word Match Detector gate go false. The circuit will function without either resistor present, although without them the system will work more slowly and it is difficult to explain what the voltage $V_{T_1}$ and $V_{T_2}$ are. In addition, the terminal $V_{T_1}$ is connected to a write control network comprising a transistor 24 arranged in series circuit relationship with a diode 25. The cathode electrode of the diode 25 is connected to the terminal $V_{T_1}$, while its anode electrode is connected to the collector electrode for the transistor 24. The remaining electrodes for the transistor 24 are connected to a write control circuit to be described more fully hereinafter.

Each cell is also arranged to be read out and its storage state recorded in a readout register. For this purpose each cell is provided with a readout diode 27 and 28, each having their cathode electrodes respectively connected to the terminals $V_{X_1}$ and $V_{X_2}$. The anode electrodes of these readout diodes are connected to the readout register wherein the individual bits read out are stored.

In an associative memory system embodying the present invention the potential $V_A$ and $V_B$ will be controlled from a compare register and for the purposes of simplifying the explanation of the basic operations using a single active device the control for these potentials has not been illustrated, but will be described more fully hereinafter. With the above structure in mind, it will now be assumed that the normal potentials assumed by the terminals $V_A$ and $V_B$ are on the order of −2.0 volts and +1.0 volt, respectively. Under these normal conditions the transistors 16, 17 and 20 are in a conductive condition and the transistor 24 in a non-conductive condition.

It will be assumed that a binary 1 is stored in an associative cell when the cell is in a fully conducting current condition and that a binary 0 is stored in the cell when it is in a non-conducting or open circuit condition. Since the operation of the four-layer diode is well known to the art it need only be recalled that a breakdown voltage has to be applied thereto before it will be rendered conductive, in this instance the breakdown voltage is assumed to be 8 volts. For the purposes of explaining the logical operations, cell No. 1 will be assumed to store a binary 1 and, therefore, will be fully conducting, while cell 2 will be in a non-conductive condition and storing binary 0. Under these storage conditions the voltages assumed by the terminals $V_{X_1}$ and $V_{X_2}$ are approximately +1.0 volt and −2.0 volts, respectively.

It will initially be assumed that the word to be compared with the bits stored in cells No. 1 and No. 2 is the word 0 0. Accordingly, the terminals $V_B$ will be driven to +5.0 volts, while the $V_A$ terminals will be maintained at −1.5 volts. When searching for the word 0 0 then, the potential assumed by the terminal $V_{X_1}$ will be approximately the potential applied to $V_{B_1}$ or on the order of +5 volts since cell No. 1 is in a conductive condition. The potential at the terminal $V_{X_1}$ is now more positive than the potential at the terminal $V_{T_2}$ causing the diode 13 to conduct and thereby the transistor 16 will be placed in a conductive condition. The conduction of the transistor 16 will couple a false signal to the OR gate 18 and a false signal will be derived from the word match detector. This will be seen to be the correct relationship, since the bit undergoing comparison is a 0 while the stored bit is a 1.

Under the same conditions the potential assumed at the terminal $V_{X_2}$ is on the order of −1.5 volts. Accordingly, the terminal $V_{X_2}$ is more positive than the terminal $V_{T_1}$ and more negative than the terminal $V_{T_2}$, therefore, the diodes 14 and 15 are maintained in their non-conducting condition. It should now be appreciated that the threshold device 16 will provide the comparison signal for cell No. 1, a false signal, and a threshold device 17 the comparison signal for cell No. 2, a true signal, with the word match detector providing a false output signal.

With the same storage states for the associative cells, it will now be assumed that the word undergoing comparison is the word 11. The potentials $V_A$ and $V_B$, then, are controlled so that $V_A$ is driven to −15 volts and $V_B$ is maintained at a +1 volt level. Under these voltage conditions the terminal $V_{X_1}$ assumes a +1 volt level, while the terminal $V_{X_2}$ is clamped at approximately −3.5 volts by the conduction of diode 15. With respect to the comparison outputs, considering cell No. 1 alone, a true or matching relationship will be signalled with regard to the cell No. 1 under these latter mentioned voltage conditions. Referring to cell No. 2, the terminal $V_{X_2}$ has assumed a −3.5 volt level and which level can be considered to be clamped through the action of the diode 15, base to emitter potential of the transistor 17 and the transistor 20. This relationship will render the terminal $V_{X_2}$ more negative than the terminal $V_{T_1}$, whereby the transistor 17 will be in a conductive condition and signal a false or mismatching signal, the correct output indication. The word match detector will then signal a mismatching relationship between the word 11 and the stored word 10.

To write a word into the single active elements, it will be assumed that the normal voltages are applied and the operation of the write control circuit is initiated. The act of writing into a word (storing information) is a two step process. In the first step all cells in the selected word are set to 0 (the cell is rendered non-conductive). In the second step those cells which are to store 1's are rendered conductive, those which are to store 0's are left alone. Both steps affect only the selected word and do not change the states of any cells in any other words. Step 1 is accomplished by momentarily turning transistor 24 on.

(Note: $V_{A1}=V_{A2}=-1.5$ volts and $V_{B1}=V_{B2}=+1$ volt during step 1.) This action drives the potentials $V_{X_1}$ and $V_{X_2}$ to $+1.5$ volts (diodes 12 and 15 conduct). This action reduces the current through cells 1 and 2 to 0, which is less than the holding current required to maintain the cells in the "on" or conducting state. Therefore, when transistor 24 turns off the cells remain in the nonconducting state. Step 2 occurs after transistor 24 turns off. On the selected word transistor 20 is turned off (it remains on for all other words). Also all the read circuits are turned off so that diodes 27 and 28 cannot conduct. While transistor 20 is off the $V_A$'s in the bit positions in which 1's are to be stored are momentarily driven more negative than the breakover voltage of the cells. This voltage appears on the cell in the selected word but does not appear on any cells in other words because of the clamping actions of the transistors 20 . . . transistors 17 . . . diodes 12 (or 15) strings. When the breakover voltage of a cell is exceeded it becomes conducting and remains that way. In the example the breakover voltage of a cell could be between say 8 volts and 14 volts.

Now, considering the procedure for reading out the information from any particular word location, it will be assumed that the normal voltage conditions prevail once again. The read operation is the same as the write operation's step 2 except that all $V_A$'s are driven very negative and the read detection circuits are enabled and establish a potential of $-7.0$ volts on the anodes of diodes 27 and 27. If the cell which is being read stores a 0 (is non-conductive) then the read diode will conduct the current produced by the $V_A$ through the resistor (10 or 11). If the cell is conductive stores a 1) then the read diodes will remain back biased. The read circuit (like the Word Match Detector) detects the presence or absence of a current through any one of the read diodes to which it is connected. With respect to the words in the memory, this procedure causes all the words except the selected word to have their read diodes back biased because the terminals $V_{T_1}$ and $V_{T_2}$ are at a negative potential level to so clamp them. In this fashion the individual storage elements of the readout register will be placed in a storage state indicative of the storage state of the corresponding cells of the selected word in the memory. The readout cells of the readout register may comprise bi-stable elements similar to the compare register.

An important feature of an associative memory is the "don't care" condition for which the cell generates a matching signal regardless of its contents. The "don't care" conditions exist in the "normal" state ($V_A=-1.5$ volts, $V_B=+1.0$ volt).

Now referring to FIG. 2, a brief examination of another single active device that may be embodied in an associative memory system of the type under consideration, will be briefly examined. The single active device illustrated in FIG. 2 is a conventional silicon controlled rectifier, S.C.R. The arrangement and operation of such a three electrode device is basically the same as that described hereinabove. The relationship can be readily appreciated when it is considered that the gate electrode of the S.C.R. may be connected to the cathode electrode and operated in the fashion of a diode. Since the semiconductor devices under consideration are of the type requiring a breakdown voltage to place them in a conductive condition, the gate electrode or the control terminal allows a more flexible method of writing information into the associative cell, since it is more convenient to control the conductive condition through this gate electrode.

Now, referring to FIG. 3, the arrangement of an associative memory system implementing a single active element will be described. The associative memory system is illustrated for three words having four binary bits each. The bits of the same order of significance are arranged in the same column, as illustrated. The binary bits are stored in the memory cells generally identified by the reference character 100. A compare register 120 is associated with the memory system and is also defined for storing a comparison word having four binary bits. The binary bits of the same binary significance stored in the comparison register are arranged in the same column as the corresponding binary bits of the memory words. The comparison cells are identified as the cells 1, 2, 3, and 4, reading from right to left, for storing the binary characters of the word undergoing comparison and are specifically illustrated in the terms of two active elements such as the common flip-flop, although any storage element may be employed. In the same general fashion, a readout register 140 is provided and is associated with each memory word to receive the binary character readout of a memory position. To this end, four storage elements identified as 1, 2, 3, and 4 reading from right to left identify the readout cells that receive the binary bits readout of a selected word. The readout cells 1, 2, 3 and 4 of the readout register 140 are arranged to receive the binary bits from the memory cells 100 storing bits of the same binary significance, as illustrated.

The readout operation is controlled by read clock pulse derived from the computer proper. The read clock pulse is coupled to OR circuits 360 arranged to control the output voltage level $V_A$. The OR circuits 360 receive the output signal from the AND circuits 200, in combination with a read clock pulse, whereby the output signal provided as a result of the application of one of these signals to the OR circuit 360 triggers the voltage source $V_A$. The voltage level assumed by the source $V_A$ in response to the read clock pulse places the associative cells 100 in the voltage conditions outlined hereinabove.

In addition, each memory word is coupled to an individual word match detector 160. The word match detectors 160 are each coupled to all of the memory cells 100 comprising a memory word for signalling a matching or mismatching relationship between the comparison word and the memory word. For this purpose, the potential on the electrodes of the single active element of the memory cells 100 are controlled by the combination of the binary bits stored in the comparison register 120 and the triggering potential derived from the source identified by the block 180. The triggering potential derived from the source 180 and the output indications from the comparison cells are logically combined in AND gating circuits 200. The output circuit from the AND gating circuits 200 are applied to trigger a potential source $V_A$ and $V_B$ which control the potentials supplied to the electrodes of the single active element comprising a memory cell 100, as described hereinabove.

For both the reading and writing operations, a particular word is selected by an address register 210. The selection information provided to the address register 210 is derived from the computer proper, as is well known to those skilled in the art. The output signal from the address register 210 then is a unique signal appearing on one of its output leads for selecting the desired word. The output signal from the address register 210 is coupled to the threshold device 17 shown within the dotted outline, identified by the reference numeral 160, which is representative of the word number 1 match detector. The operation of the threshold device 17 for each word match detector is similar to that described hereinabove in conjunction with FIG. 1. Simultaneous with the application of an address signal to the word match detectors, the same address signal is applied to an AND circuit 380 arranged with a write control circuit 400 individual to each word location. The AND circuits 380 are each coupled to an individual output circuit from the address register 210 to be responsive thereto. These AND circuits are also each simultaneously responsive to a write clock pulse that is coupled to each of the AND circuits 380. The write clock pulses are derived from the computer proper. Accordingly, upon the simultaneous occurrence of an address signal and a write clock pulse, an output signal will be provided from the addressed AND circuit 380 for exciting the associated write control circuit 400. The write control circuit 400 modifies the voltage at the associated terminal $V_{T1}$, as described hereinabove.

Now referring to the detailed circuit diagram of the memory cell shown in the upper lefthand portion of FIG. 1, the circuit organization showing the use of a four-layer diode 300 will be described. As is well known, a four-layer diode comprises four semi-conductor layers of the N and of the P type which may be arranged in a NPNP relationship. The potential applied to the anode electrode of the diode 300 is the potential $V_B$. The potential applied to the cathode electrode of the diode 300 is the potenial $V_A$. A dropping resistor 310 is connected between the $V_A$ terminal and the cathode electrode of the diode 300. A pair of comparison diodes 320 and 330 are individually connected between the cathode electrode of the four-layer diode 300 and the input circuit of the corresponding word match detector 160, in this instance, word number 1 match detector. The diode 320 is arranged with its anode electrode connected in common with the cathode electrode of the four-layer diode 300. The cathode electrode for the diode 320 is directly connected to the word match detector 160 at the terminal identified as $-V_T$. The diode 330 is arranged with its cathode electrode connected in common with the cathode electrode of the four-layer diode 300 and its anode electrode connected to the $+V_T$ terminal of the word matching detector 160, as illustrated. For readout purposes a diode 340 is provided and arranged with its anode electrode connected with the cathode electrode of the four-layer diode 300. The cathode electrode of the readout diode 340 is directly connected to the readout cell of the readout register 140, in this instance, the cell "4."

With the above description in mind, the operation of the associative memory system FIG. 3 will now be described. The system will be described, assuming that the word 1 is 1101, word 2 is 1000 and word 3 is 0001 and that the word entered into the compare register is word 1101. These binary bits are stored in the individual cells in reading from right to left, as the cells of the compare register 120 are identified.

After the word undergoing comparison is entered into the comparison register 120, the system is in condition for effecting an associative compare. For this purpose, the triggering source 180 is excited and the potentials provided from the sources $V_A$ and $V_B$ assume the preselected voltage levels, in accordance with the storage state of the associative compare cell. It should be appreciated that these potentials $V_A$ and $V_B$ are simultaneously applied to each of the associative cells 100 arranged in the same column and that each column of associative cells 100 is simultaneously excited. Accordingly, the sensing diodes 320 and 330 for each associative cell 100 will assume the correct conductive condition to provide a comparison signal indicative of the matching or mismatching relationship between that particular cell and the corresponding compare cell. As mentioned hereinabove, in the event any one single cell for a stored word mismatches the output of the word matching detector will signal a mismatching relationship.

If now the content of word number 3 is examined, the word 0001, and compared with the compare word 1101, it will be seen that bits 1 and 2 match, while bits 3 and 4 mismatch and will therefore provide mismatching signals to word number 3 match detector. Accordingly, word number 3 match detector will signal a mismatch at its output terminal $C_0$. In the same fashion, word number 2 will also signal a mismatch, since bits 1 and 3 mismatch, while bits 2 and 4 match. Examining word number 1, the word 1101 will be seen to match bit by bit each word in the compare register 120. Accordingly, each associative cell 100 for word number 1 will provide a true or matching output signal to the word 1 match detector, and signal the matching relationship between word number 1 and the compare word. This, of course, is a correct output indication, in accordance with the assumed storage state of the three words.

From the systems standpoint, a writing operation is affected by first providing to the address register 210 the address of the word to be written into. The word to be written into the desired location of the memory is entered into the compare register 120. For this purpose, it will be assumed that the word 1101 will be written into word location number 2 which presently stores the word 1000. The application of the address register information to the address register 210 will result in the provision of an addressing signal from the address register 210, which is applied to the word number 2 match detector and to the AND circuit 380 for word number 2. Upon the application of the write control potentials to the AND circuits 380 from the computer proper, the write control circuit 400 for word number 2 will be excited, and only this write control circuit will be excited, since the other AND circuits 380 have not been provided with an address signal at this time. The excitation of the write control circuit 400 for word number 2 will be effective to turn off all the associative cells 100 for word number 2 that are storing a binary 1, so that the previous word is essentially erased and all of the associative cells 100 are in a non-conductive condition.

The word to be written into the word location number 2 is stored in the compare register 120, and the compare register output indications are now processed in the same fashion as for a comparison operation. To this end, all the compare cells that store a 1 are utilized to drive the potential source $V_A$ to $-15$ volts. The compare cells which store a 0 are maintained in their normal state. The 15 volt level from the sources $V_A$ is provided by exciting the triggering source 180 to satisfy the input conditions for the AND circuits 200, which receive a true signal from the compare cells storing a binary 1. Since all the words, except the addressed word are clamped, this operation has no effect on any words stored in the memory except the addressed word and, therefore, the desired word will be written into the word 2 location through this procedure.

It should be appreciated that on the systems basis, that during a writing operation the readout register 140 should be disabled. For this purpose the bi-stable elements that comprise the readout register 140 may be rendered nonresponsive to the writing operations in a conventional fashion.

The reading operations from a systems standpoint is essentially the same as that described hereinabove. As for the writing procedure, the word to be read out is to be addressed from the address register 210. The addressing of a particular word location causes only the associative cells 100 individual to that addressed word location to be responsive to the subsequent reading procedures. The reading procedure comprises the application of a read clock pulse to the OR circuits 360. The reading clock pulse being applied to each of the OR circuits 360 simultaneously. The application of the read clock pulse by means of the OR circuits 360 is effective to drive the potentials sources $V_A$ to $-15$ volts and, thereby, render the readout diodes associated with an associative cell 100 storing a binary 0 conductive. The states of the readout cells for the readout register 140 will assume the same storage states as the associative cells 100 for the selected word, thereby providing the correct readout.

I claim:

1. An associative memory comprising a plurality of memory cells arranged in rows and columns, each of said memory cells comprising a single active element switchable between a plurality of storage states, a compare register having a plurality of compare cells for storing information to be compared with the information in said memory cells, the compare cells being arranged in the same column as the memory cells storing the binary bits of the same order of significance, means connected to each of the compare cells for examining the information stored in each compare cell and connected to each of the memory cells in the same column for simultaneously operating on the memory cells in accordance with the binary character of the compare cells to produce a comparison output response from each memory cell, and a word match detector arranged with each row of memory cells and responsive to the comparison response for indicating the matching relationship between the information stored in the compare register and the words in the memory system.

2. An associative memory as defined in claim 1 wherein the single active memory element is a four-layer diode.

3. An associative memory as defined in claim 1 wherein the single active memory element is a gate electrode controlled rectifier.

4. An associative memory as defined in claim 2 including potential source means for controlling the potentials applied to the electrodes of the four-layer diode, and gating means connected to be responsive to the binary character of the compare cells and the potential source for producing an output signal for interrogating the diodes in the same column as the corresponding compare cell.

5. An associative memory as defined in claim 1 including means for writing new information into the memory cells.

6. An associative memory as defined in claim 1 including means for reading out the information in the memory cells.

7. In an associative memory system including a single active element having at least two stable states and comprising a semiconductor element having at least two electrodes, an impedance element connected to one of the electrodes, a junction between said one electrode and the impedance element functioning as a control terminal, means connected to said control terminal for signalling the comparison between an undergoing comparison and the binary bit represented by the conductive condition of said semiconductor element, and potential means, individually controllable for representation of binary data undergoing comparison, connected to the free electrode of said semiconductor element and the remaining electrode of the impedance element.

8. In an associative memory system according to claim 7 wherein the signalling means comprises a pair of unilaterally conductive devices oppositely poled and connected to said control electrode.

9. In an associative memory system according to claim 8 including individual detector means coupled to each of said unilaterally conductive devices for producing an output signal representative of a match or a mismatch between the binary data undergoing comparison and the state of the element.

10. In an associative memory system according to claim 9 including gating means for combining the output signals of the detector means to form a single output representative of a match or a mismatch.

References Cited

UNITED STATES PATENTS 3,375,502 3/1968 Shively ------------ 307—238

TERRELL W. FEARS, Primary Examiner

U.S. Cl. X.R.

307—238; 340—172.5

PO-1050
(5/69)

UNITED STATES PATENT OFFICE
CERTIFICATE OF CORRECTION

Patent No. 3,491,342 Dated January 20, 1970

Inventor(s) E.S. Lee III

It is certified that error appears in the above-identified patent and that said Letters Patent are hereby corrected as shown below:

Col. 5, line 69, "FIG.3" should read --FIGS. 4a and 4b--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents